United States Patent
Cho et al.

(10) Patent No.: US 9,693,288 B2
(45) Date of Patent: Jun. 27, 2017

(54) METHOD AND APPARATUS FOR OBTAINING INFORMATION RELATED TO BEACON TRANSMISSION IN WIRELESS COMMUNICATION SYSTEM

(71) Applicant: LG ELECTRONICS INC., Seoul (KE)

(72) Inventors: Heejeong Cho, Seoul (KR); Eunjong Lee, Seoul (KR); Sunam Kim, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/654,794

(22) PCT Filed: Jan. 3, 2014

(86) PCT No.: PCT/KR2014/000068
§ 371 (c)(1),
(2) Date: Jun. 22, 2015

(87) PCT Pub. No.: WO2014/109510
PCT Pub. Date: Jul. 17, 2014

(65) Prior Publication Data
US 2015/0341844 A1    Nov. 26, 2015

Related U.S. Application Data

(60) Provisional application No. 61/749,927, filed on Jan. 8, 2013.

(51) Int. Cl.
*H04W 48/08* (2009.01)
*H04W 40/24* (2009.01)
(Continued)

(52) U.S. Cl.
CPC ......... *H04W 48/08* (2013.01); *H04W 40/244* (2013.01); *H04W 74/00* (2013.01); *H04W 84/12* (2013.01); *H04W 88/06* (2013.01)

(58) Field of Classification Search
None
See application file for complete search history.

(56) References Cited

U.S. PATENT DOCUMENTS

2006/0217147 A1\* 9/2006 Olvera-Hernandez H04W 36/005
455/552.1
2008/0253341 A1  10/2008 Cordeiro et al.
(Continued)

FOREIGN PATENT DOCUMENTS

| EP | 2424304 | 2/2012 |
|----|---------|--------|
| JP | 2008-160221 | 7/2008 |
| WO | 2012011789 A2 | 1/2012 |

OTHER PUBLICATIONS

European Patent Office Application No. 14737509.1, Search Report dated Jul. 12, 2016, 11 pages.
(Continued)

*Primary Examiner* — Andrew Lai
*Assistant Examiner* — Jamaal Henson
(74) *Attorney, Agent, or Firm* — Lee Hong Degerman Kang Waimey

(57) ABSTRACT

A method and apparatus for obtaining information related to beacon transmission in a wireless communication system is provided. A node of a primary radio access technology (RAT) system obtains first information related to beacon transmission including information on a start point of a beacon interval of each entity of a secondary RAT system, and transmits second information related to the beacon transmission based on the obtained first information related to the beacon transmission to a general device through the primary RAT system.

9 Claims, 15 Drawing Sheets

(51) Int. Cl.
  *H04W 84/12* (2009.01)
  *H04W 74/00* (2009.01)
  *H04W 88/06* (2009.01)

(56) References Cited

U.S. PATENT DOCUMENTS

| | | |
|---|---|---|
| 2011/0267977 A1 | 11/2011 | Doppler et al. |
| 2012/0155439 A1 | 6/2012 | Marinier et al. |
| 2012/0157096 A1* | 6/2012 | Baek .................... H04B 17/318 455/434 |
| 2012/0178448 A1* | 7/2012 | Yuk ........................ H04W 88/06 455/435.1 |
| 2013/0023267 A1* | 1/2013 | Ong ..................... H04W 48/10 455/435.1 |
| 2013/0122904 A1 | 5/2013 | Lee et al. |
| 2014/0010223 A1* | 1/2014 | Wang .................... H04W 48/12 370/338 |

OTHER PUBLICATIONS

PCT International Application No. PCT/KR2014/000068, Written Opinion of the International Searching Authority dated Apr. 28, 2014, 1 page.

* cited by examiner

METHOD AND APPARATUS FOR OBTAINING INFORMATION RELATED TO BEACON TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2014/000068, filed on Jan. 3, 2014, which claims the benefit of U.S. Provisional Application No. 61/749,927, filed on Jan. 8, 2013, the contents of which are all hereby incorporated by reference herein in their entirety.

BACKGROUND OF THE INVENTION

Field of the Invention

The present invention relates to wireless communications, and more particularly, to a method and apparatus for obtaining information related to beacon transmission in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless LAN (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In a fifth-generation mobile communication system constituted of a plurality of RATs, a primary RAT system needs to grasp the entities of a secondary RAT system that operates within its own coverage. For example, in case that a primary RAT system is a cellular system, and a secondary RAT system is a Wi-Fi system, a cellular node such as an eNodeB (eNB), mobility management entity (MME), or new cellular entity need be aware of which access points (APs) are in operation within its coverage. The primary RAT system may acquire information on entities of the secondary RAT system, in operation within its coverage, according to various methods.

A method in which a primary RAT system may effectively obtain information of secondary RAT system entities operating within coverage thereof, and provide corresponding information to a general device such as a user equipment (UE), etc, to thus configure an optimal communication system is required.

SUMMARY OF THE INVENTION

The present invention provides a method and apparatus for obtaining information related to a beacon in a wireless communication system. The present invention provides a method in which an entity of a primary RAT system obtains information related to beacon transmission of an entity of a secondary RAT system in a communication system where a cellular system and a Wi-Fi system are converged. The present invention also provides a method in which an entity of a primary RAT system obtains information related to beacon transmission of an entity of a secondary RAT system to thus optimize a procedure for a general device such as a user equipment (UE), etc, to access a secondary RAT system in a communication system where a cellular system and a Wi-Fi system are converged.

In an aspect, a method for obtaining, by a node of a primary radio access technology (RAT) system, information related to beacon transmission in a wireless communication system is provided. The method includes obtaining first information related to beacon transmission including information on a start point of a beacon interval of each entity of a secondary RAT system, and transmitting second information related to the beacon transmission based on the obtained first information related to the beacon transmission to a general device through the primary RAT system.

The first information related to the beacon transmission may further include a frequency channel, operating class, channel number, and the beacon interval.

The first information related to the beacon transmission may further include an identifier of each entity of the secondary RAT system.

The first information related to the beacon transmission may be directly obtained from an access point (AP) server or may be obtained from the AP server through a gateway.

The AP server may be a device providing a generic advertisement service (GAS) using an access network query protocol (ANQP).

The first information related to the beacon transmission may be obtained from each entity of the secondary RAT system.

The first information related to the beacon transmission may be obtained from a general device that receives a beacon transmitted from each entity of the secondary RAT system.

The primary RAT system may be a cellular system, and the node of the primary RAT system may be an eNodeB (eNB), a mobility management entity (MME), or new entity of the cellular system.

The secondary RAT system may be a Wi-Fi system, and each entity of the secondary RAT system may be an AP.

The second information related to the beacon transmission may include information on a start point of a beacon interval of each entity of the secondary RAT system set as a time point in the nearest future at which the general device receives a beacon.

In another aspect, a method for transmitting, by an entity of a secondary radio access technology (RAT) system, information related to beacon transmission in a wireless communication system is provided. The method includes transmitting information related to beacon transmission including a frequency channel, operating class, channel number, a beacon interval of each entity of the secondary RAT system, and information on a start point of the beacon interval of each entity of the secondary RAT system.

The start point of the beacon interval may be expressed with a timing value of the secondary RAT system, and the timing value of the secondary RAT system may be determined based on a timing conversion value of a primary RAT system and an offset.

The timing conversion value of the primary RAT system and the offset may be obtained from a general device.

The timing conversion value of the primary RAT system and the offset may be obtained through a broadcast channel of the primary RAT system.

The information related to the beacon transmission may be transmitted to an access point (AP) or a node of the primary RAT system.

Access of a general device such as a UE, etc, to a Wi-Fi system in a communication system where a cellular system and a Wi-Fi system are converged may be optimized.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
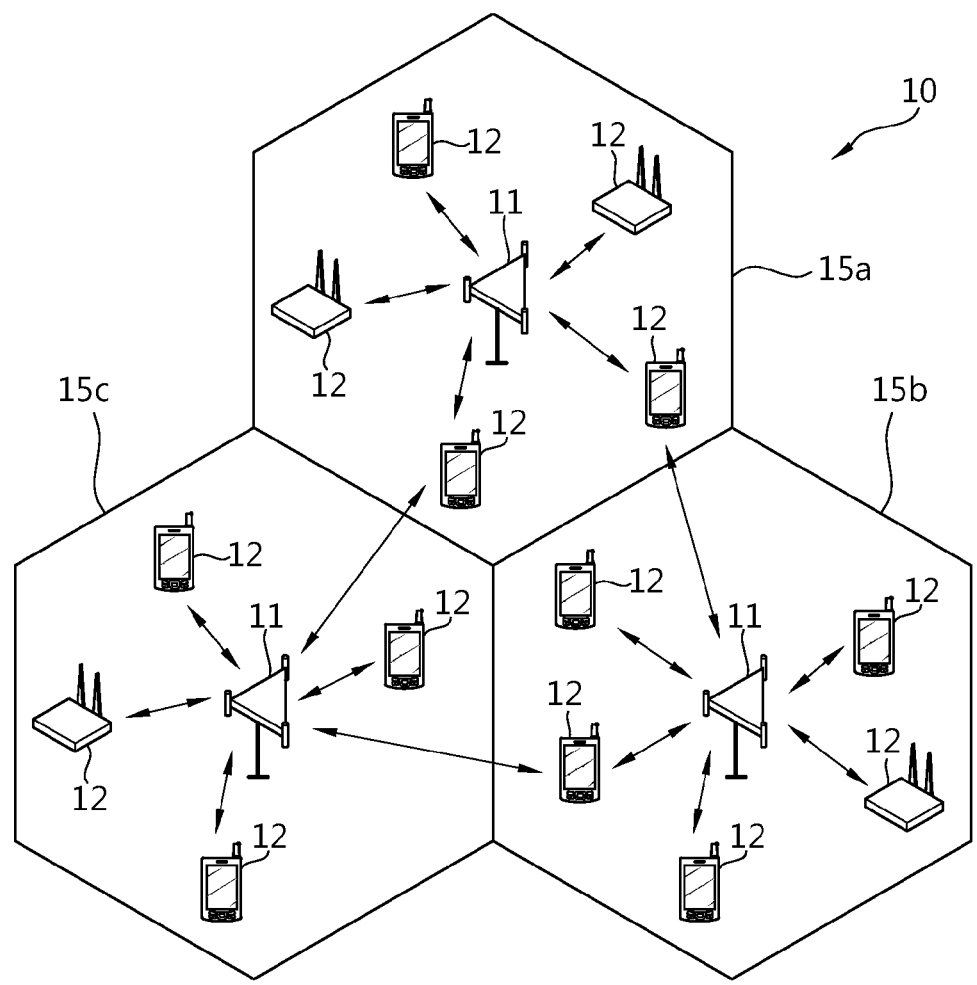
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
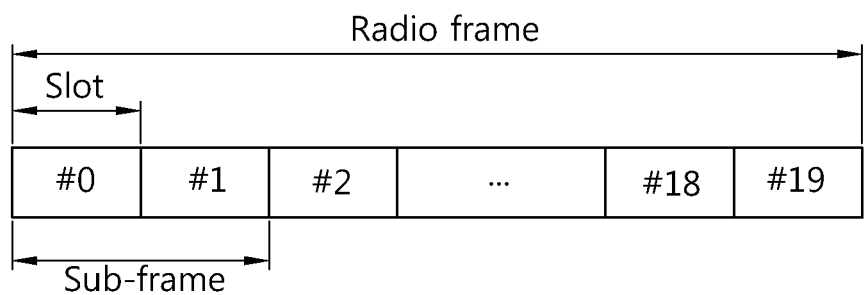
FIG. 2 shows a structure of a radio frame in 3GPP LTE.

FIG. 2 shows a structure of a radio frame in 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
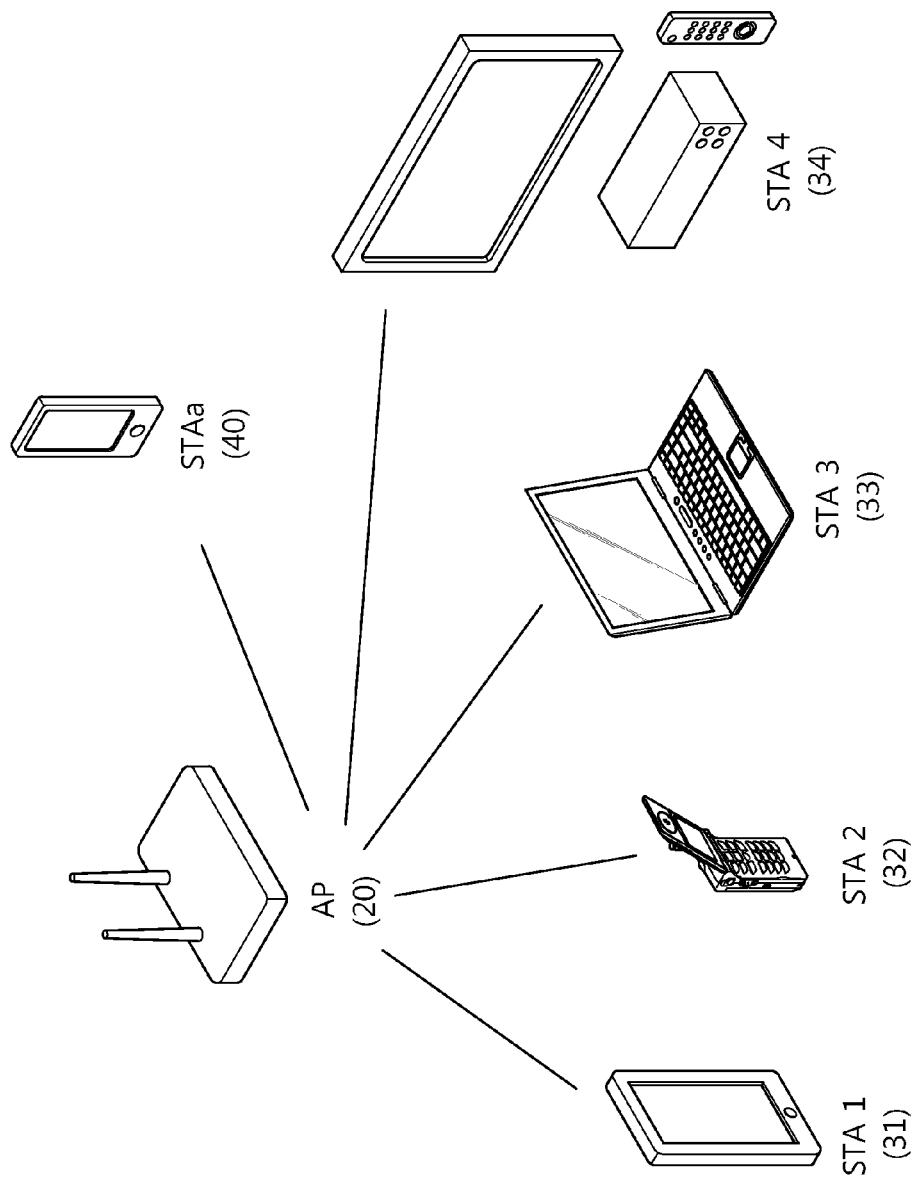
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

Figure 4:
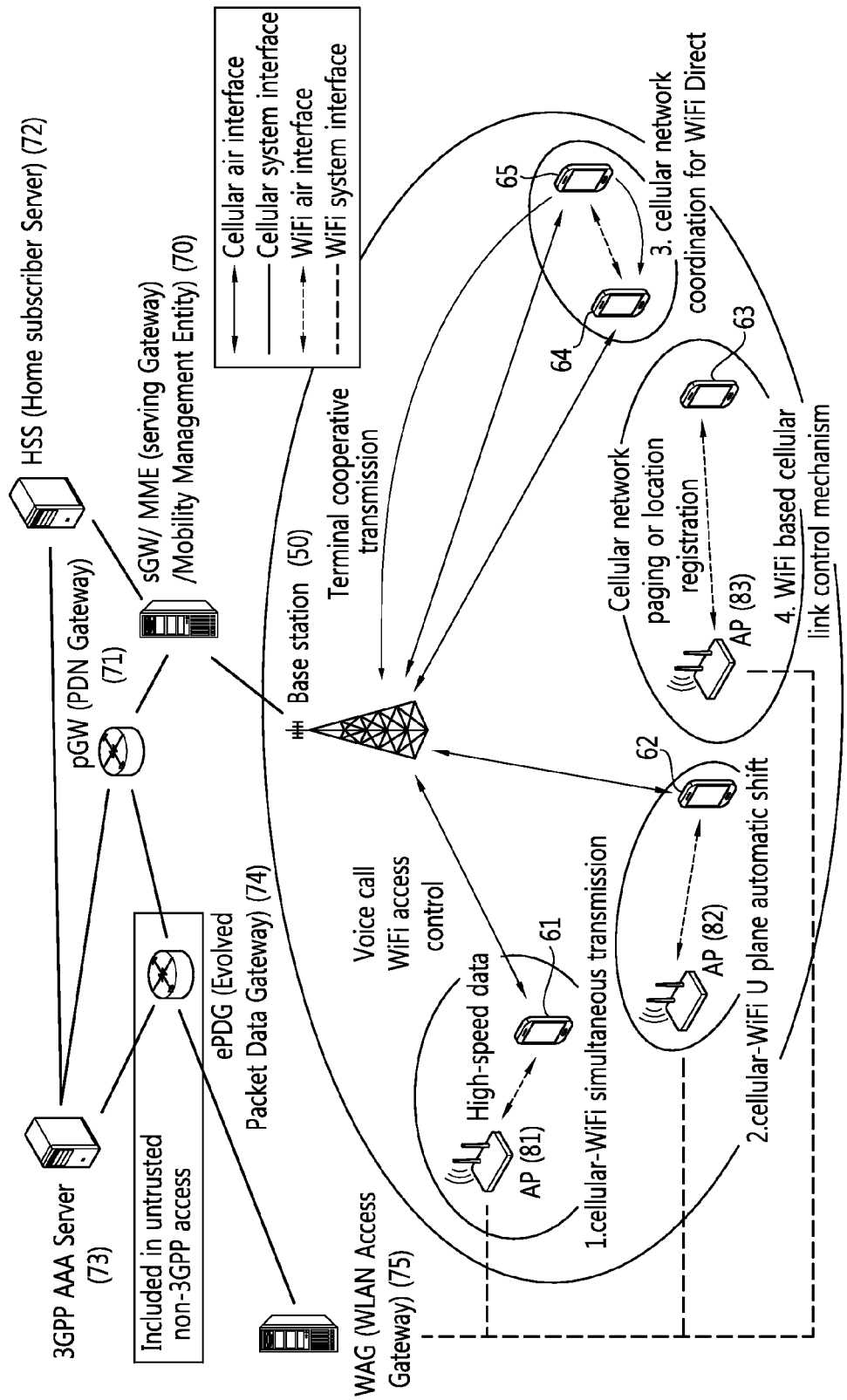
FIG. 4 shows an example of a scenario of a converged communication system of a cellular system and a Wi-Fi system.

FIG. 4 shows an example of a scenario of a converged communication system of a cellular system and a Wi-Fi system.

It is assumed in FIG. 4 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 4, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (e-PDG) 74 through the cellular system interface. The e-PDG 74 may be included only in untrusted non-3GPP access. The e-PDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

A beacon in an IEEE 802.11 is described. A beacon request/report pair enables a STA to request from another STA a list of APs whose beacons it can receive on a specified channel or channels. This measurement may be done by active mode (like active scan), passive mode (like passive scan), or beacon table modes. If the measurement request is accepted and is in passive mode, a duration timer is set. Then the measuring STA monitors the requested channel, measures beacon, probe response, and measurement pilot power levels (received channel power indicator (RCPI)), and logs all beacons, probe responses, and measurement pilots received within the measurement duration. If the measurement request is in active mode, the measuring STA sends a probe request on the requested channel at the beginning of the measurement duration, then monitors the requested channel, measures beacon, probe response, and measurement pilot power levels (RCPI), and logs all beacons, probe responses, and measurement pilots received within the measurement duration. If the request is beacon table mode, then the measuring STA returns a beacon report containing the current contents of any stored beacon information for any supported channel with the requested SSID and BSSID without performing additional measurements.

Figure 5:
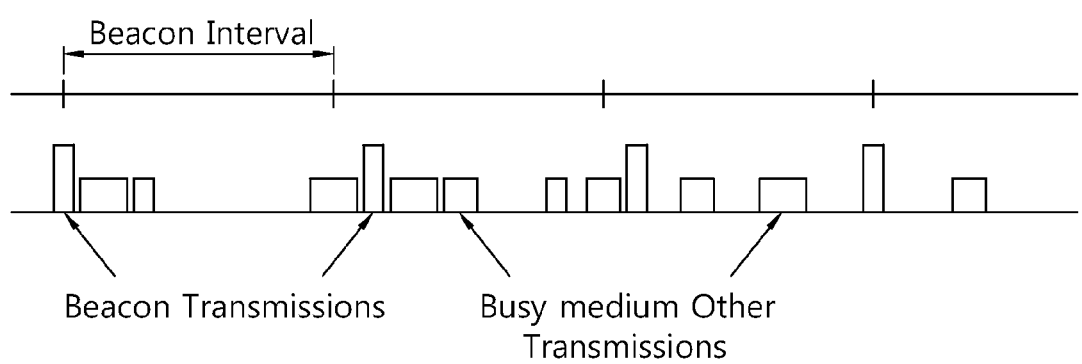
FIG. 5 shows a beacon transmission on a busy network.

FIG. 5 shows a beacon transmission on a busy network.

Beacon generation in an infrastructure BSS is described. The AP shall define the timing for the entire BSS by transmitting beacon frames according to dot11BeaconPeriod. This defines a series of target beacon transmission times (TBTTs) exactly dot11BeaconPeriod TUs apart. The TBTT may be called a beacon interval. The beacon interval is established by the AP. Time 0 is defined to be a TBTT with the beacon frame being a delivery traffic indication message (DTIM). At each TBTT, the AP shall schedule a beacon frame as the next frame for transmission according to the medium access rules. The beacon period is included in beacon and probe response frames, and a STA shall adopt that beacon period when joining the BSS, i.e., the STA sets its dot11BeaconPeriod variable to that beacon period.

Though the transmission of a beacon frame may be delayed because of carrier sense multiple access (CSMA) deferrals, subsequent beacon frames are scheduled at the undelayed nominal beacon interval.

Hereinafter, a method for passively controlling, by a cellular network, beacon transmission of a Wi-Fi system entity included in an infrastructure BSS in a communication system where the cellular system and Wi-Fi system are converged is described. The cellular system may be a primary RAT system and the Wi-Fi system may be a secondary RAT system in the converged communication system. The cellular system may need to recognize which Wi-Fi system entity operates within its coverage. Thus, the Wi-Fi system entity may provide information of the Wi-Fi system entity itself to a management device such as a management server, a cellular node (e.g., an eNB or MME), etc. In particular, in order to improve an unnecessary Wi-Fi system access time and power consumption of a general device, the cellular system may need to manage information related to a beacon of the Wi-Fi system. The Wi-Fi system entity may transmit information related to its beacon transmission to a management device. The information related to the beacon transmission may include a frequency channel, an operating class, a channel number, a beacon interval, etc. The cellular system may optimize an access procedure with respect to the Wi-Fi system of a general device such as a user equipment (UE), etc, by providing information related to the beacon transmission of the Wi-Fi-system entity thereto.

In the following description, it is assumed that the primary RAT system is a 3GPP LTE(-A) among cellular systems, and the secondary RAT system is a Wi-Fi system, but the present invention is not limited thereto. Also, a secondary RAT system entity is assumed to be an AP of a Wi-Fi system, but the present invention is not limited thereto.

First, a method for obtaining information related to beacon transmission of an AP by a cellular system is described.

(1) A cellular node may obtain information related to beacon transmission of an AP by using a core network (CN) interface. The AP may transmit information related to beacon transmission such as frequency channel, an operating class, a channel number, a beacon interval, etc, to an AP server, in registering to the AP server. The frequency channel refers to a frequency band at which a beacon is transmitted. The beacon interval refers to an interval at which a beacon is transmitted by the AP. The cellular node, which is an AP information management entity, may obtain the information related to beacon transmission of the AP from the AP server. The cellular node, which is an AP information management entity, may be an eNB, MME or new entity of the cellular system for obtaining the AP information.

The information related to beacon transmission may further include information on a start point of the beacon interval. The start point of the beacon interval may be expressed with a Wi-Fi system timing value. Also, the information related to beacon transmission may further include a cellular system timing conversion value with respect to a Wi-Fi system timing value and an offset. The cellular system timing conversion value may be expressed with a system frame number such as a radio frame number or a subframe number, a slot number, or a symbol number, and an offset may be expressed with a unit such as us, ms, etc, or a slot number or a symbol number.

To this end, the AP should obtain timing information of the cellular system. The AP may request and obtain a cellular system timing conversion value and an offset with respect to a time point at which a general device receives a beacon from the general device. Upon obtaining the cellular system timing conversion value and the offset with respect to the time point at which the general device receives a beacon, the AP may adjust the cellular system timing value and the offset obtained from the general device by reflecting a difference between a start point of the beacon interval and a time point at which a beacon was actually transmitted.

Figure 6:
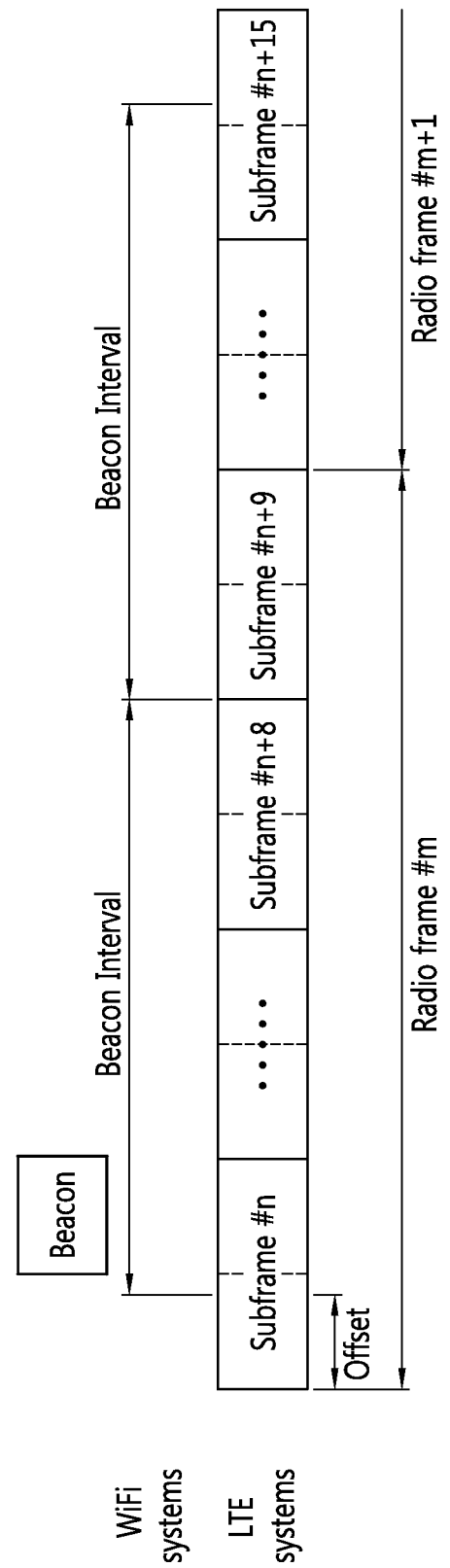
FIG. 6 shows an example of a method for obtaining a start point of a beacon interval according to an embodiment of the present invention.

FIG. 6 shows an example of a method for obtaining a start point of a beacon interval according to an embodiment of the present invention.

Referring to FIG. 6, the general device receives a beacon at a time point at which an offset is 0.5 ms in a subframe n of a radio frame m. Thus, the general device may determine the cellular system timing conversion value and the offset as the subframe n of the radio frame m and 0.5 ms and report the same to the AP. Meanwhile, it is assumed that a difference between a start point of the beacon interval and a time point at which a beacon is actually transmitted is 0.1 ms. The AP may determine a start point of the beacon interval as a time point at which the offset is 0.4 ms in the subframe n of the radio frame m, by reflecting delay of 0.1 ms. The AP may include information on the start point of the beacon interval expressed with the cellular system timing conversion value and offset in the information related to beacon transmission and transmit the same to register the information related to beacon transmission of the AP itself to the AP server.

Alternatively, in order to obtain timing information of the cellular system, the AP may obtain a system frame number of the cellular system through a broadcast channel. In this case, it is assumed that the AP may receive a broadcast channel such as a preamble and/or a master information block (MIB) through downlink from the cellular system. The AP may obtain a system frame number of the cellular system through the MIB. Also, timing of the cellular system and that of the Wi-Fi system may be synchronized. For example, the timing of the cellular system and the timing of the Wi-Fi system may be aligned by a unit of least common multiple of a time unit of the Wi-Fi system and a subframe or slot of the cellular system.

Figure 7:
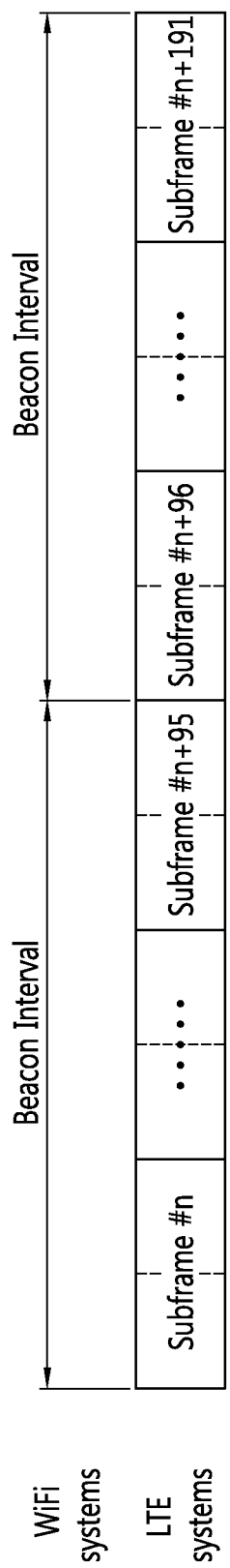
FIG. 7 shows an example of a method for obtaining a start point of a beacon interval according to another embodiment of the present invention.

FIG. 7 shows an example of a method for obtaining a start point of a beacon interval according to another embodiment of the present invention.

Referring to FIG. 7, a start point of a beacon interval is aligned with a start point of a subframe of the cellular system. The AP may synchronize with the cellular system through a preamble, obtain a system frame number of the cellular system through a broadcast channel such as an MIB, etc, and adjust a beacon interval and a start point of a frame of the cellular system by synchronizing a timing of the cellular system and a timing of the Wi-Fi system.

In the description above, an AP server may be a device to provide a generic advertisement service (GAS) using an access network query protocol (ANQP). The ANQP is a query protocol for access network information retrieval transported by GAS public action frames. GAS provides functionality that enables STAs to discover the availability of information related to desired network services, e.g., information about services such as provided in an IBSS, local access services, available subscription service providers (SSPs) and/or subscription service provider networks (SSPNs) or other external networks. GAS uses a generic container to advertise network services' information over an IEEE 802.11 network. Public action frames are used to transport this information. Further, the AP server may be a WAG. Or, the AP server may be a device providing an access network discovery and selection function (ANDSF).

Figure 8:
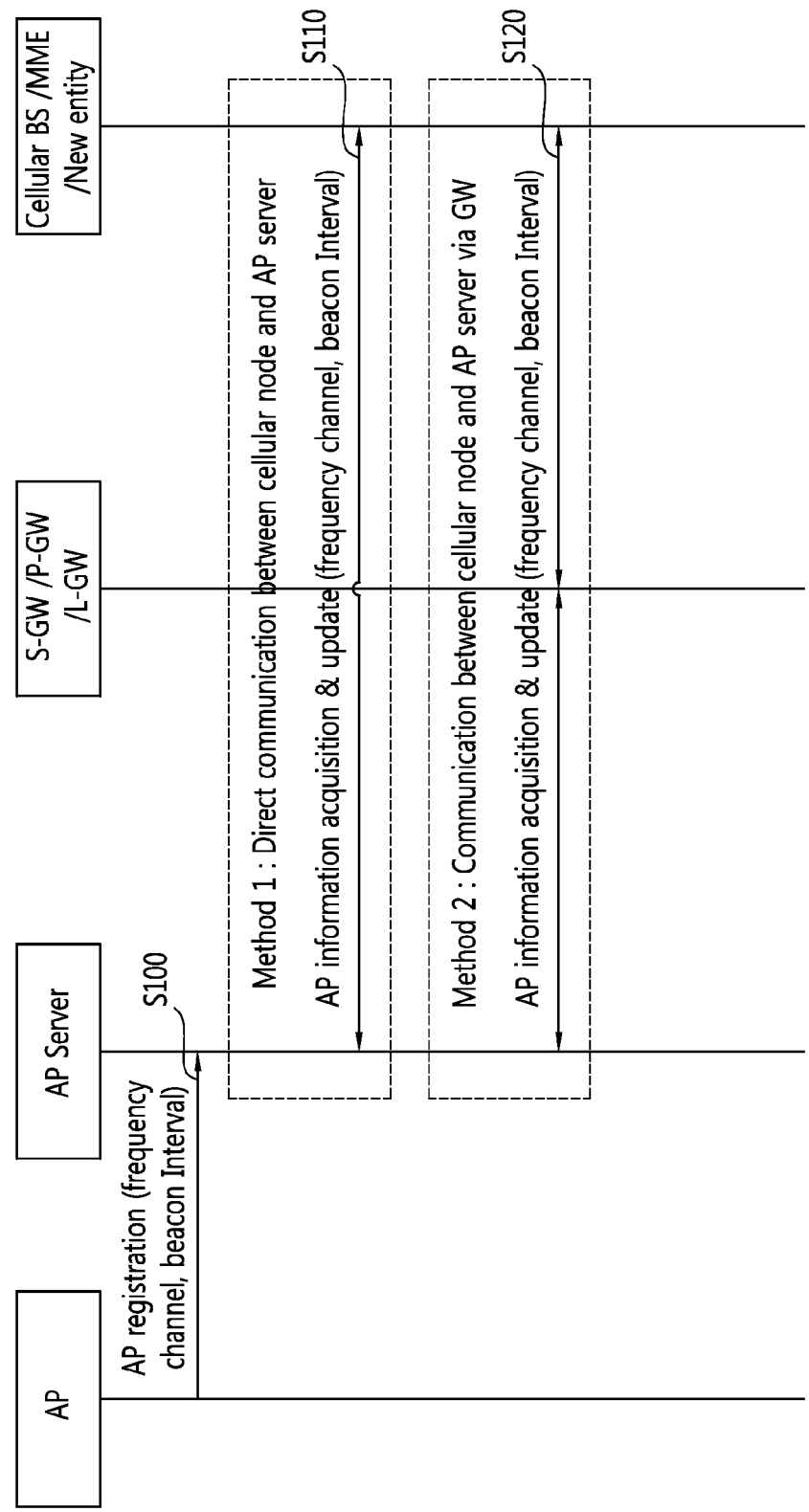
FIG. 8 shows an example of a method for obtaining information related to beacon transmission according to an embodiment of the present invention.

FIG. 8 shows an example of a method for obtaining information related to beacon transmission according to an embodiment of the present invention.

Referring to FIG. 8, the AP transmits information related to beacon transmission such as a frequency channel, an operating class, a channel number, a beacon interval, etc, to the AP server to perform AP registration.

A cellular node, which is an AP information management entity, obtains information of APs existing within cell or eNB coverage managed by the cellular node, through the AP server. The AP information may include information related to beacon transmission such as a frequency channel, an operating class, a channel number, a beacon interval, etc, and may also include an AP identifier such as a MAC address (e.g., BSSID), etc. The cellular node may be an eNB, MME, or new eneity for obtaining the AP information.

The cellular node may receive the AP information directly from the AP server or may receive the AP information through a gateway. In step S110, the cellular node receives the AP information directly from the AP server. In step S120, the cellular node receives AP information from the AP server through a gateway such as S-GW/P-GW/local gateway (L-GW), etc. Also, the cellular node may request a periodical transmission of the AP information from the AP server.

Meanwhile, in a case in which the information such as the frequency channel, the beacon interval, etc, delivered in the process of registering the AP itself to the AP server is changed, the AP may inform the AP server accordingly. In this case, the AP may inform the AP server accordingly, although there is no request from an AP information management entity.

(2) A cellular node may obtain information related to beacon transmission of the AP by using a cellular air interface of the AP. The AP may transmit the information related to the beacon transmission such as the frequency channel, the operating class, the channel number, the beacon interval, etc, to the cellular node, while registering the AP itself to the cellular node, which is an AP information management entity, based on an AP identifier such as a MAC address (e.g., BSSID), etc. Thus, the cellular node may obtain the information related to the beacon transmission of the AP directly from the AP. The cellular node, which is an AP information management entity, may be an eNB, MME or new entity of the cellular system for obtaining the AP information. When the cellular node is an eNB, the cellular node may obtain AP information from the AP through a cellular radio link. When the cellular node is an MME or new entity, the cellular node may obtain AP information from the AP through a cellular radio link and a network interface such as an S1 interface, etc.

The information related to beacon transmission may further include information on a start point of the beacon interval. The start point of the beacon interval may be expressed with a Wi-Fi system timing value. Also, the information related to beacon transmission may further include a cellular system timing conversion value with respect to a Wi-Fi system timing value and an offset. The cellular system timing conversion value may be expressed with a system frame number such as a radio frame number or a subframe number, a slot number, or a symbol number, and an offset may be expressed with a unit such as us, ms, etc., or a slot number or a symbol number.

Figure 9:
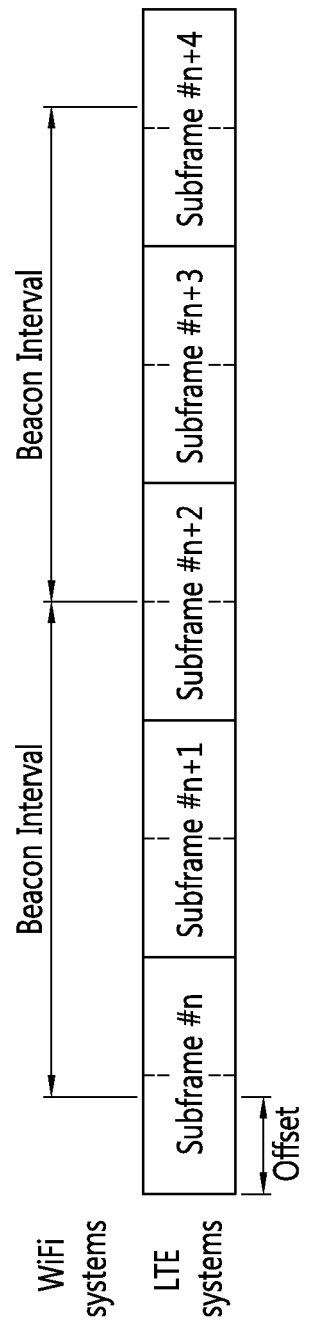
FIG. 9 shows an example of a method for obtaining a start point of a beacon interval according to another embodiment of the present invention.

FIG. 9 shows an example of a method for obtaining a start point of a beacon interval according to another embodiment of the present invention. Referring to FIG. 9, a start point of a beacon interval is expressed with a Wi-Fi system timing value, and the Wi-Fi system timing value is expressed with a cellular system timing conversion value and an offset.

Alternatively, as described above in FIG. 7, a timing of the cellular system and that of the Wi-Fi system may be synchronized. Since it is assumed that a cellular radio link exists between the cellular node and the AP, a timing of the cellular system and that of the Wi-Fi system may be synchronized. For example, the timing of the cellular system and the timing of the Wi-Fi system may be aligned by a unit of least common multiple of a time unit of the Wi-Fi system and a subframe or slot of the cellular system. In this case, both a Wi-Fi system timing value and a cellular system conversion value may not need to be transmitted.

Figure 10:
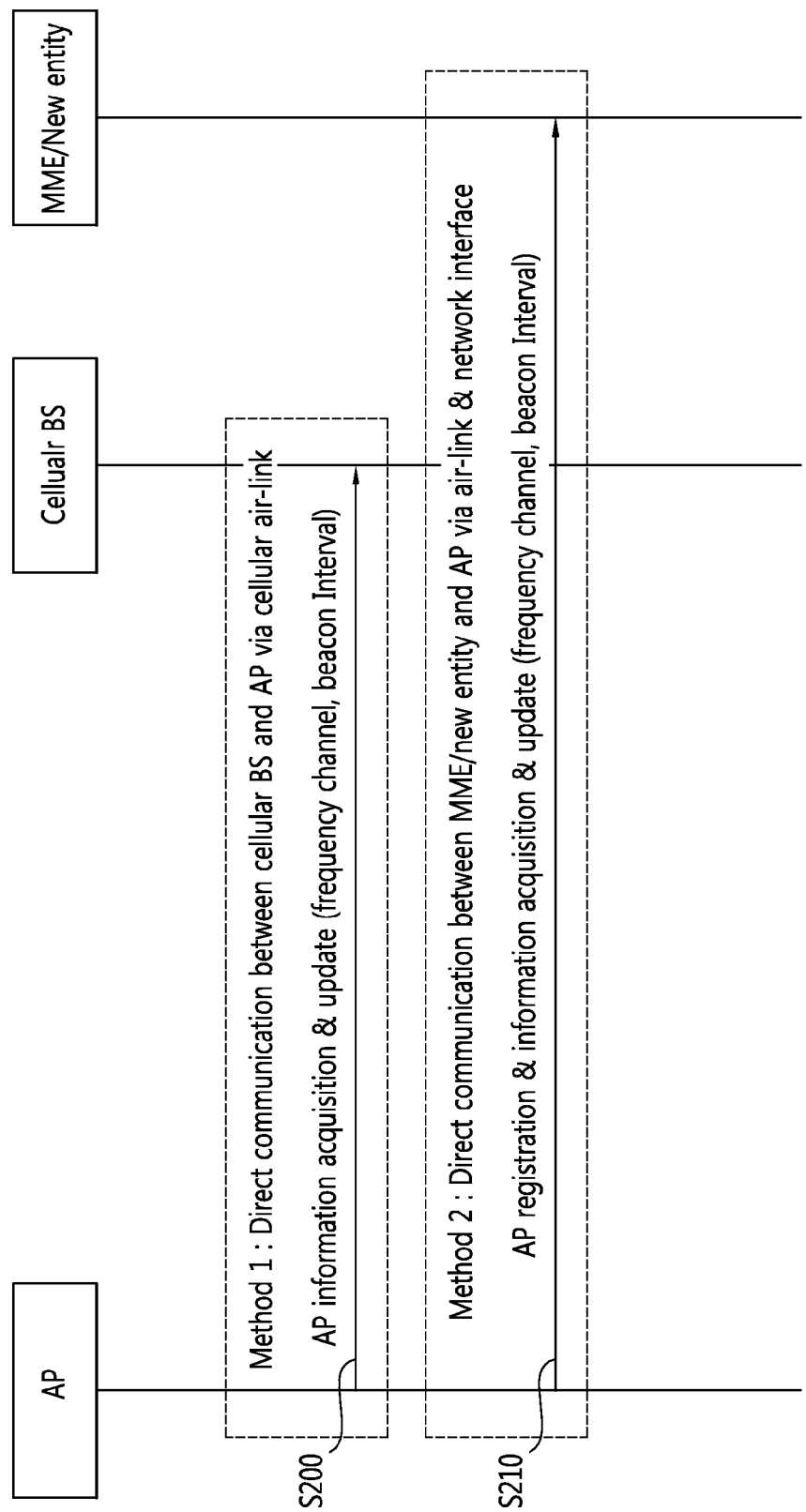
FIG. 10 shows an example of a method for obtaining a start point of a beacon interval according to another embodiment of the present invention.

FIG. 10 shows an example of a method for obtaining a start point of a beacon interval according to another embodiment of the present invention.

A cellular node, which is an AP information management entity, obtains information of APs existing within cell or eNB coverage managed by the cellular node, directly from the AP server. The AP information may include information related to beacon transmission such as a frequency channel, an operating class, a channel number, a beacon interval, etc. Also, the AP information may include an AP identifier such as a MAC address (e.g., BSSID), etc.

The cellular node may be an eNB, MME, or new entity for obtaining AP information. Referring to FIG. 10, in step S200, the AP transmits information related to beacon transmission such as a frequency channel, an operating class, a channel number, a beacon interval, etc, to the eNB through a cellular radio link, and registers the AP itself to the eNB. Alternatively, in step S210, the AP transmits the information related to beacon transmission such as a frequency channel, an operating class, a channel number, a beacon interval, etc, to an MME or new entity through a cellular radio link and network interface and registers the AP itself to the MME or new entity.

Meanwhile, in a case in which the information such as the frequency channel, the beacon interval, etc, delivered in the process of registering the AP itself to the cellular node, which is an AP information management entity, is changed, the AP may inform the cellular node accordingly. In this case, the AP may inform the cellular node accordingly, although there is no request from an AP information management entity.

(3) A cellular node may obtain information related to beacon transmission of the AP by using a cellular air interface of a general device. The AP may transmit a beacon or probe message, and upon receiving the same, the general device may transmit the information related to the beacon transmission such as the frequency channel, the operating class, the channel number, the beacon interval, etc, to the cellular node, which is an AP information management entity, while registering the AP to the cellular node based on an AP identifier such as a MAC address (e.g., BSSID), etc. Thus, the cellular node may obtain the information related to the beacon transmission of the AP through the general device. The cellular node, which is an AP information management entity, may be an eNB, MME, or new entity for obtaining AP information. When the cellular node is an eNB, the cellular node may obtain AP information from the AP through a cellular radio link. When the cellular node is an MME or new entity, the cellular node may obtain AP information from the general device through a cellular radio link and a network interface such as an S1 interface, etc.

The information related to beacon transmission may further include information on a start point of the beacon interval. The start point of the beacon interval may be expressed with a Wi-Fi system timing value. Also, the information related to beacon transmission may further include a cellular system timing conversion value with respect to a Wi-Fi system timing value and an offset. The cellular system timing conversion value may be expressed with a system frame number such as a radio frame number or a subframe number, a slot number, or a symbol number, and an offset may be expressed with a unit such as us, ms, etc, or a slot number or a symbol number. A method for obtaining a start point of a beacon interval has been described above referring to FIG. 6.

Figure 11:
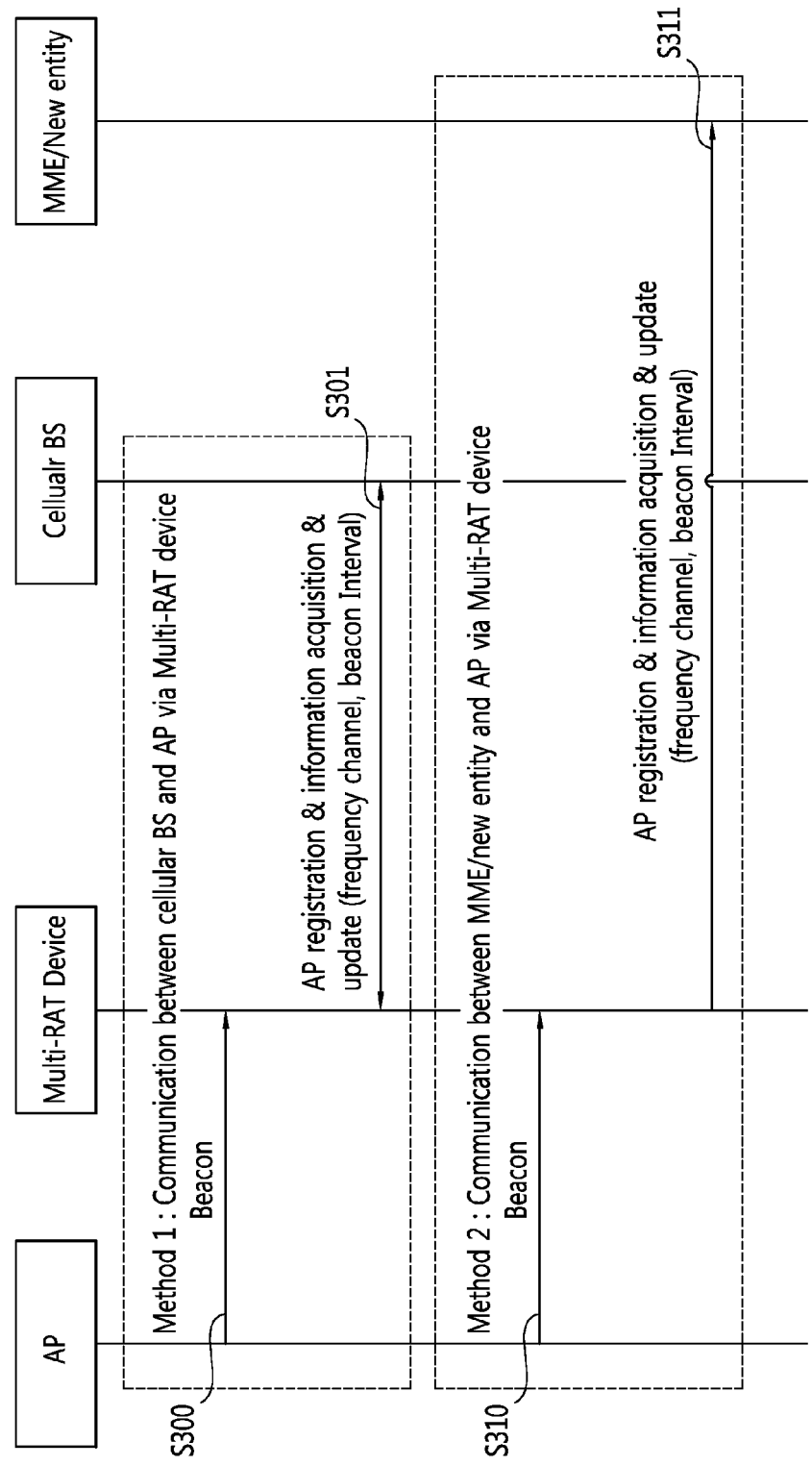
FIG. 11 shows an example of a method for obtaining a start point of a beacon interval according to another embodiment of the present invention.

FIG. 11 shows an example of a method for obtaining a start point of a beacon interval according to another embodiment of the present invention.

A cellular node, which is an AP information management envity, obtains information of APs existing within cell or eNB coverage managed by the cellular node, from a general device. The general device may be a multi-RAT device supporting a plurality of RATs. The AP information may include information related to beacon transmission such as a frequency channel, an operating class, a channel number, a beacon interval, etc. Also, the AP information may include an AP identifier such as a MAC address (e.g., BSSID), etc.

The cellular node may be an eNB, MME or new entity for obtaining AP information. Referring to FIG. 11, in step S300, the multi-RAT device receives a beacon from an AP, and in step S301, the multi-RAT device transmits information related to beacon transmission such as a frequency channel, an operating class, a channel number, a beacon interval, etc, to the eNB through a cellular radio link, and registers the AP to the eNB. Alternatively, in step S310, the multi-RAT device receives a beacon from the AP, and in step S311, the multi-RAT device transmits the information related to beacon transmission such as a frequency channel, an operating class, a channel number, a beacon interval, etc, to an MME or new entity through a cellular radio link and a network interface and registers the AP to the MME or new entity.

Meanwhile, in a case in which the information such as the frequency channel, the beacon interval, etc, delivered in the process of registering, by a general device, the AP to the cellular node, which is an AP information management entity, is changed, the general device may inform the cellular node accordingly. In this case, the general device may inform the cellular node accordingly, although there is no request from an AP information management entity.

Hereinafter, a method for transmitting obtained information related to beacon transmission to a general device is described.

A cellular node, which is an AP information management entity, transmits AP information through a cellular network. The cellular node may be an eNB, MME, or new entity for obtaining AP information. The AP information may include information related to beacon transmission of each AP such as a frequency channel, an operating class, a channel number, a beacon interval, a start point of a beacon interval, etc.

Also, the AP information may include an AP identifier such as a MAC address (e.g., BSSID), etc.

The cellular node, which is an AP information management entity, may transmit only AP information of APs adjacent to the corresponding general device. Also, a start point of a beacon interval among the information to be transmitted may be set as a value in the nearest future at which the corresponding general device can receive a beacon. For example, in a case in which a length of a beacon interval is 1.024*1000 ms, a start point of the beacon interval is an offset 0.4 ms in a subframe n of a radio frame m, and a current system frame number is a radio frame (m+91), a start point of the beacon interval to be transmitted to the general device may be determined as a time point of offset 0.4 ms in a subframe (n+4) of a radio frame (m+102).

Figure 12:
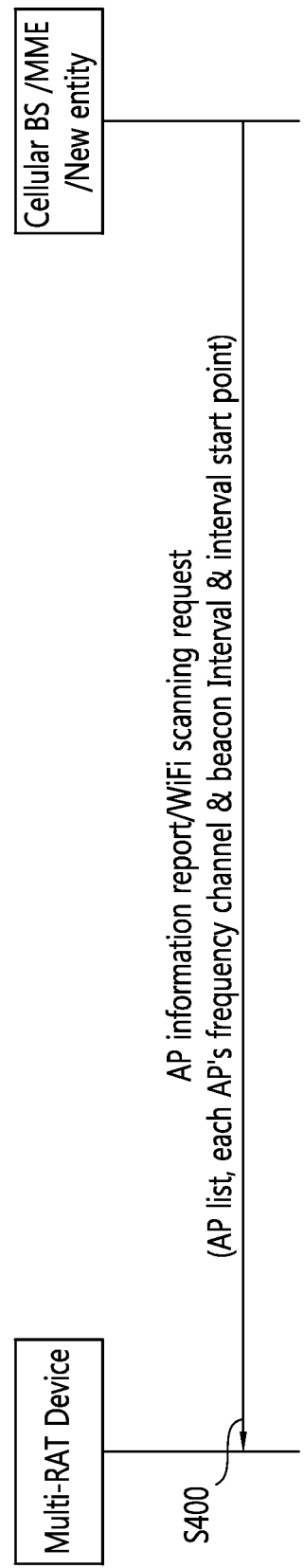
FIG. 12 shows an example of a method for transmitting information related to beacon transmission according to an embodiment of the present invention.

FIG. 12 shows an example of a method for transmitting information related to beacon transmission according to an embodiment of the present invention. In step S400, a cellular node, which is any one of an eNB, MME, or new entity, transmits AP information report or Wi-Fi scanning request message to a multi-RAT device. The AP information report or Wi-Fi scanning request message may include information related to beacon transmission of each AP, such as a frequency channel, an operating class, a channel number, a beacon interval, etc. Also, the AP information may include an AP identifier such as MAC address (e.g., BSSID), etc.

Upon receiving the information related to beacon transmission, the general device may optimize Wi-Fi access by using the corresponding information. In detail, a time required for perform scanning and obtaining Wi-Fi system information may be reduced. For a Wi-Fi access, the general device needs to first perform scanning to obtain system information, and in the prior art, at which time point a beacon including Wi-Fi system information is transmitted cannot be known, so the general device should continue to perform monitoring until when a beacon is received.

Figure 13:
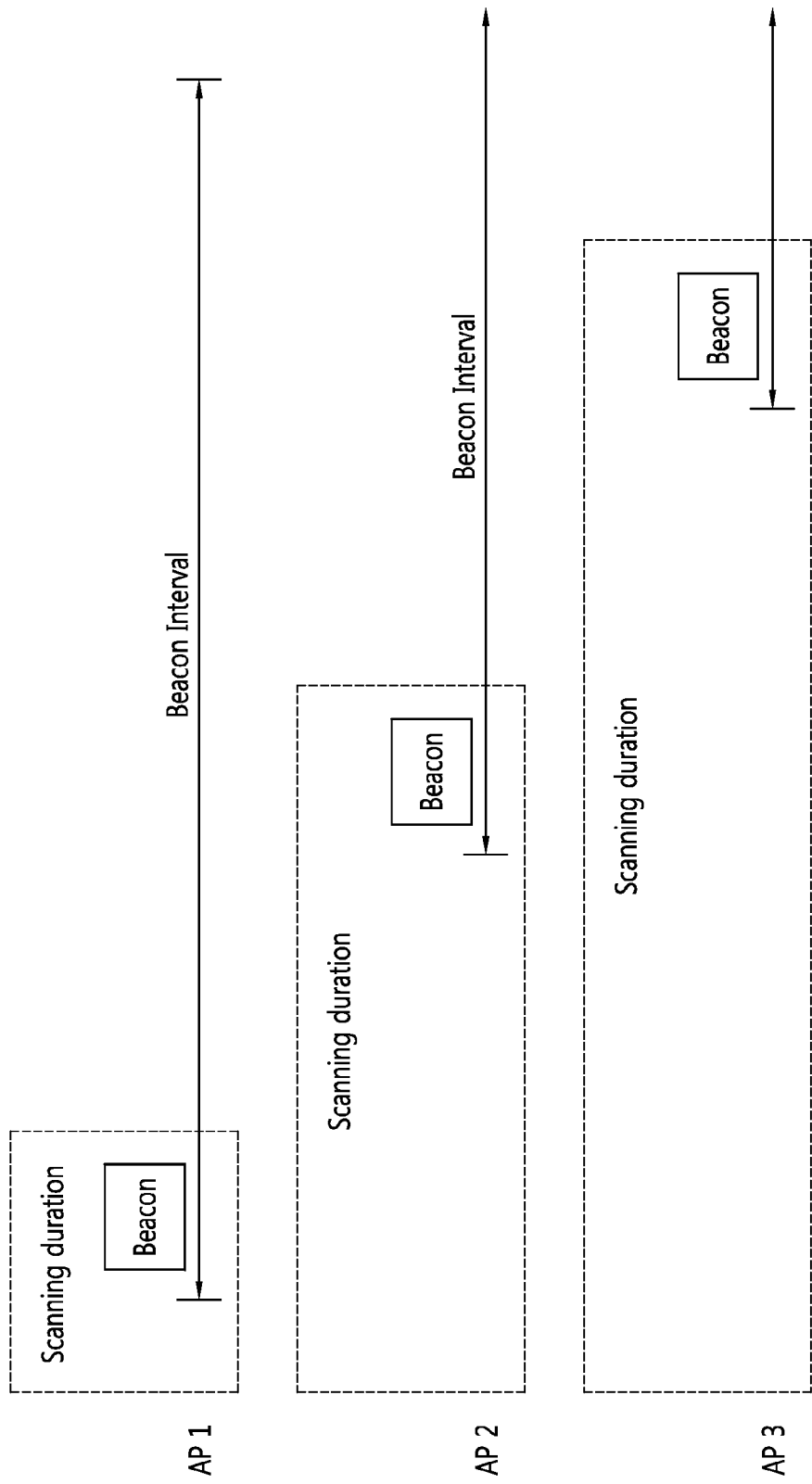
FIG. 13 shows scanning durations when a general device performs scanning according to a conventional method.

FIG. 13 shows scanning durations when a general device performs scanning according to a conventional method. Referring to FIG. 13, in case of an AP1, since a beacon interval starts relatively early, the general device may perform scanning relatively briefly until when a beacon transmitted from the AP1 is received. In comparison, in case of AP2 and AP3, since beacon intervals start late, the general device should perform scanning on frequency channels for a long period of time until when a beacon transmitted from the AP2 and AP3 is received. Namely, the general device cannot know at which time point a beacon is transmitted and which of the APs transmits a beacon, so it should continuously perform scanning on frequency channels until when a beacon is received at least once.

Figure 14:
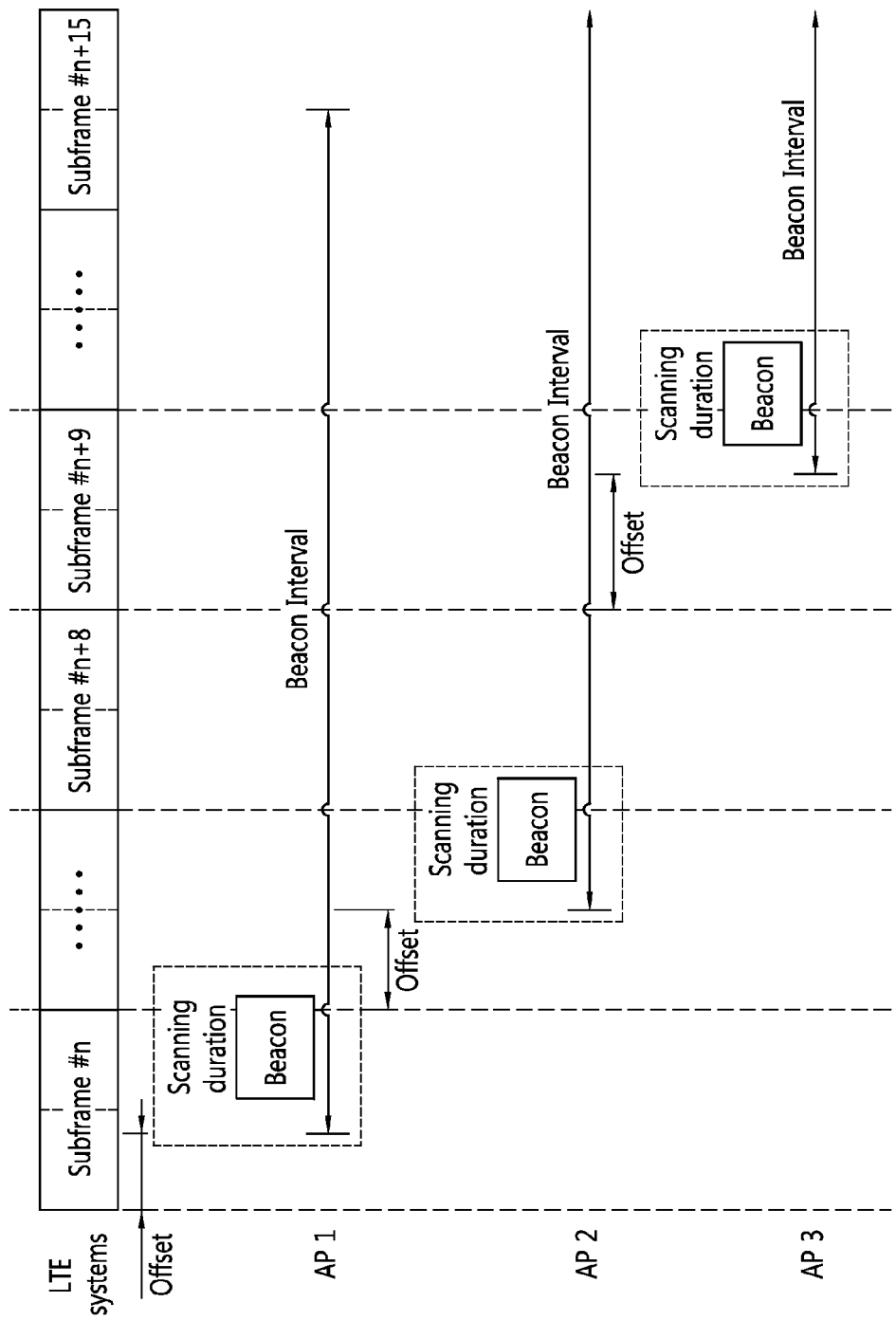
FIG. 14 shows scanning durations when a general device performs scanning according to an embodiment of the present invention.

FIG. 14 shows scanning durations when a general device performs scanning according to an embodiment of the present invention. Referring to FIG. 14, start points of beacon intervals of respective APs are different, and a start point of a beacon interval of each AP may be expressed with a system frame number and an offset of cellular system, respectively. According to the embodiment of the present invention, in a case in which a general device obtains information related to beacon transmission from a cellular node, which is an AP information management device, the general device may know at which time point each AP transmits a beacon. Thus, a scanning duration in which the general device performs scanning to receive a beacon transmitted from each AP may be set to be different. The general device may determine optimal AP scanning order according to a start point of a beacon interval of each AP. The general device may perform scanning according to a time point at which each AP transmits a beacon, and thus, a time required for the general device to perform scanning and obtaining Wi-Fi system information may be reduced.

Figure 15:
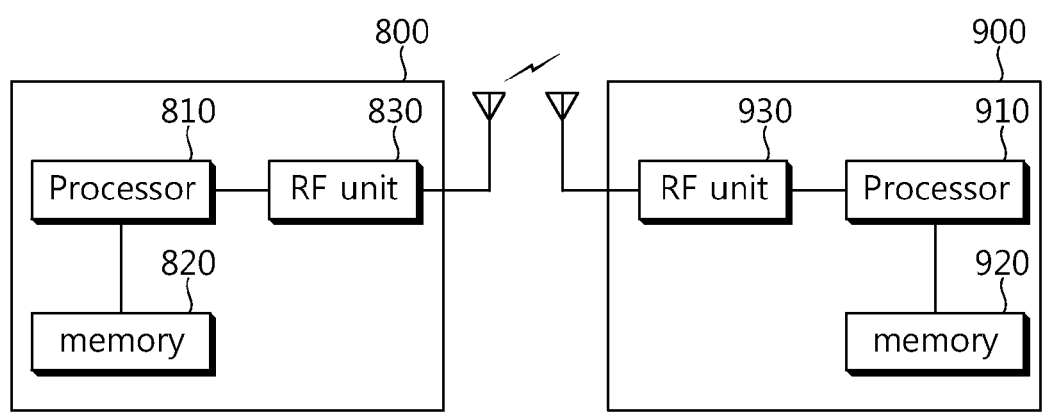
FIG. 15 is a block diagram showing wireless communication system to implement an embodiment of the present invention.

FIG. 15 is a block diagram showing wireless communication system to implement an embodiment of the present invention.

A cellular node 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A Wi-Fi entity or general device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for obtaining, by a node of a primary radio access technology (RAT) system, information related to a beacon transmission in a wireless communication system, the method comprising:

obtaining first information related to the beacon transmission, the first information including information on a frequency channel, a beacon interval and a start point of the beacon interval of each entity of a secondary RAT system; and transmitting second information related to the beacon transmission based on the obtained first information to a user equipment through the primary RAT system, wherein the start point of the beacon interval of each entity of the secondary RAT is aligned by being synchronized with a start point of a subframe of the primary RAT system, wherein the second information related to the beacon transmission includes the start point of the beacon interval of each entity of the secondary RAT system, wherein the start point of the beacon interval of each entity of the secondary RAT system included in the second information related to the beacon transmission is set as a time point in the nearest future at which the user equipment can receive a beacon, based on the start point of the beacon interval of each entity of the secondary RAT system obtained via the first information related to the beacon transmission, wherein the primary RAT is a 3rd generation partnership project (3GPP) long-term evolution (LTE) system, and wherein the secondary RAT system is a Wi-Fi system.

2. The method of claim 1, wherein the first information related to the beacon transmission further includes an identifier of each entity of the secondary RAT system.

3. The method of claim 1, wherein the first information related to the beacon transmission is directly obtained from an access point (AP) server or is obtained from the AP server through a gateway.

4. The method of claim 3, wherein the AP server is a device providing a generic advertisement service (GAS) using an access network query protocol (ANQP).

5. The method of claim 1, wherein the first information related to the beacon transmission is obtained from each entity of the secondary RAT system.

6. The method of claim 1, wherein the first information related to the beacon transmission is obtained from another user equipment that receives a beacon transmitted from each entity of the secondary RAT system.

7. The method of claim 1,
wherein the node of the primary RAT system is an eNodeB (eNB), or a mobility management entity (MME).

8. The method of claim 1,
wherein each entity of the secondary RAT system is an AP.

9. A node of a primary radio access technology (RAT) system, the node configured to obtain information related to a beacon transmission in a wireless communication system, the node comprising:

a memory;
a radio frequency unit; and
a processor operatively connected to the memory and the radio frequency unit, the processor configured to:
obtain first information related to the beacon transmission, the first information including information on a frequency channel, a beacon interval and a start point of the beacon interval of each entity of a secondary RAT system; and
transmit second information related to the beacon transmission based on the obtained first information to a user equipment through the primary RAT system,
wherein the start point of the beacon interval of each entity of the secondary RAT is aligned by being synchronized with a start point of a subframe of the primary RAT system,
wherein the second information related to the beacon transmission includes the start point of the beacon interval of each entity of the secondary RAT system,
wherein the start point of the beacon interval of each entity of the secondary RAT system included in the second information related to the beacon transmission is set as a time point in the nearest future at which the user equipment can receive a beacon, based on the start point of the beacon interval of each entity of the secondary RAT system obtained via the first information related to the beacon transmission,
wherein the primary RAT is a 3rd generation partnership project (3GPP) long-term evolution (LTE) system, and
wherein the secondary RAT system is a Wi-Fi system.

* * * * *